United States Patent Office 2,701,553
Patented Feb. 8, 1955

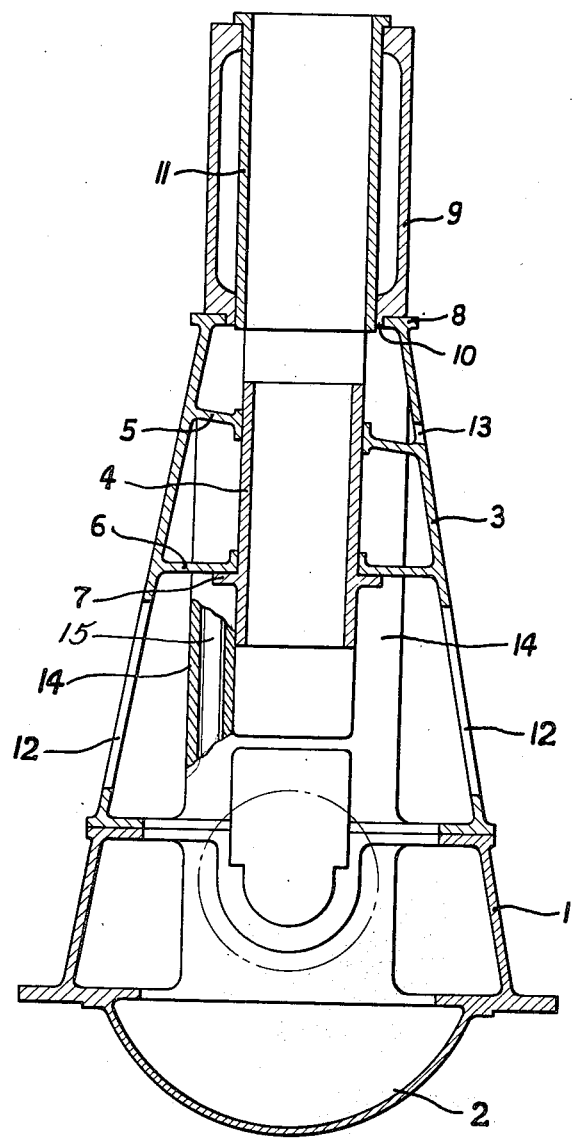

2,701,553

BED FOR INTERNAL-COMBUSTION ENGINES

Dietrich von Lassberg, Augsburg, Germany, assignor to Maschinenfabrik Augsburg-Nurnberg A. G., Augsburg, Germany, a corporation of Germany Application March 1, 1952, Serial No. 274,323

Claims priority, application Germany March 10, 1951

8 Claims. (Cl. 121—194)

This invention relates to a bed for internal combustion engines, more particularly, diesel engines of the vertical type, with crosshead.

In general, internal combustion engines with crosshead are designed in such a way that a block extending over the whole length of the engine is supported on several individual beds, the cylinder liners being concentrically inserted in said block. The guide for the crosshead is fastened on the beds and has to be carefully aligned in accordance with the axis of the cylinder on assembling the engine. Moreover, this conventional construction requires a stuffing box between the crosshead and the piston, which stuffing box over-rides either the piston body or the piston rod, whereby a very careful machining of these parts is necessitated. Finally, the packing rings located in the stuffing box are subject to a certain wear and tear and have to be replaced from time to time.

It is the object of the present invention to provide a design of an internal combustion engine in which these drawbacks are avoided.

With this and further objects in view, according to the present invention coaxial cylindrical openings are provided in one or more partition walls of the bed and in the upper flange thereof for centering the cylindrical crosshead guides and the cylinder or the cylinder liners, respectively. A great deal of elaborate and expensive fitting work can be saved by the coaxial arrangement of the cylinder liners and of the cylindrical crosshead guide in centering bores of the partition walls of the bed or of the upper flange thereof. The cylindrical crosshead guide is provided with a flange which is adapted so that the crosshead guide can be inserted from below into the openings of the partition walls and suspended in a simple manner from the lowermost partition wall. According to a further feature of the invention the dimensions of the fixing flange are adapted so as to permit insertion of the crosshead guide through the lateral apertures of the part of the bed defining the driving gear space, i. e., the crank case, whereby the assembling work is further simplified.

The centering of the cylindrical crosshead guide in the partition walls of the engine bed offers further advantageous possibilities relating to the lubrication of the engine. Thus according to a further feature of the invention at least one of the partition walls centering the crosshead guide is constructed in such a way that it forms an oil-tight separation between the crank case and the space thereabove, whereby the conventional stuffing box on the piston rod or on the piston body can be dispensed with, so that the piston rod, for instance, can be left unwrought. Owing to the elimination of the stuffing box, the stuffing box rings which would be subject to wear are also eliminated. Therefore, in an internal combustion engine according to the present invention the oil consumption can be kept constant.

On principle, it is possible to use as a crosshead guide directly a second cylinder liner which is inserted into the bed from below. Advantageously, however, the diameter of the crosshead guide is made slightly smaller than the diameter of the cylinder, so that the piston including the crosshead can be removed in an upward direction. According to a further feature of the invention the outer diameter of the crosshead guide is made smaller than the internal diameter of the cylinder liner, whereby polluted oil dripping from the cylinder liner falls directly onto the intermediate transverse wall of the bed from which it can be drawn off without polluting the oil of the crosshead guide. A slight inclination of the uppermost intermediate wall will cause the lubricating oil to collect in the lowest part of the intermediate wall.

According to a still further feature of the invention the oil-tight separation of the driving gear space can be completed by constructing the barrels for the reception of the tie rods in a closed form in the range of the crank case so that oil vapors cannot rise from the same through the tie rod barrels.

One embodiment of an engine bed according to the invention is shown by way of example in the accompanying drawing, showing an axial section through a cylinder and a crosshead guide.

Referring to the drawing, it will be seen that the bed 3 is erected on the base plate 1 having an oil pan 2. The cylindrical crosshead guide 4 is introduced into the concentric openings of the partition walls 5 and 6 and secured to wall 6 by means of a flange 7. The upper flange 8 of the bed 3 is formed with bores in which the individual cylinder blocks 9 are engaged with a collar 10.

Inserted in the cylinder block 9 is a cylinder liner 11. Since the bores in the upper flange 8 of the bed, in the partition walls 5 and 6, and in the cylinder block 9 are accurately coaxial to each other, the centering and aligning of the cylindrical crosshead guide in relation to the cylinder liner will not cause any difficulties. While the cylindrical crosshead guide 4 is introduced through the lateral apertures 12 of the crank case and inserted into the bores of the walls 5 and 6 from below, the piston rod and the crosshead can be inserted through the cylinder from the top end thereof. The oil dripping from the cylinder liner is collected on the inclined partition wall 5 and can easily be removed through the aperture 13. The barrels 14 receiving the tie rods 15 for direct connection of the cylinder blocks with the crank shaft bearings (not shown) or with the base plate 1, have no openings towards the crank case, so as to prevent the escape of oil vapors from the crank case.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In an engine frame construction for an internal combustion engine having a crankcase, a piston, and a crosshead connected to said piston, the combination which comprises an engine bed, means for mounting said bed on said crankcase, a cylinder for said piston, a cylindrical crosshead guide for said crosshead, a plurality of transverse partitions across said engine bed, said partitions having coaxial apertures therein for receiving and coaxially aligning said cylinder and said crosshead guide, the inside diameter of said cylinder being at least as great as the outside diameter of said crosshead guide for preventing oil dripping from said cylinder from entering said crosshead guide, and means forming an oil-tight joint between said crosshead guide and one of said transverse partitions above said crankcase preventing oil dripping from said cylinder from entering said crankcase.

2. In an internal combustion engine having a cylinder, a piston, a crosshead, and a piston rod connecting said piston with said crosshead and operating without contact with packing material, the combination which comprises an engine bed, at least one transverse partition across said engine bed, a cylinder receiving flange at the top of said engine bed, a replaceable cylindrical crosshead guide, coaxial apertures in said flange and said partition for receiving and coaxially aligning said cylinder and said crosshead guide, the internal diameter of said cylinder being at least as great as the external diameter of the portion of said crosshead guide adjacent said cylinder preventing oil dripping from the circumference of said cylinder from entering said crosshead guide, and an oil-tight joint between said crosshead guide and said partition forming therebetween an oil receiving space for collecting said oil dripping from said cylinder.

3. In an internal combustion engine having a cylinder, a piston, a crosshead, and a piston rod connecting said piston with said crosshead and operating without contact with packing material, the combination which comprises an engine bed, at least one transverse partition across said engine bed, a cylinder receiving flange at the top of said engine bed, a replaceable cylindrical crosshead guide, coaxial apertures in said flange and said partition for receiving and coaxially aligning said cylinder and said crosshead guide, the internal diameter of said cylinder being at least as great as the external diameter of the portion of said crosshead guide adjacent said cylinder preventing oil dripping from the circumference of said cylinder from entering said crosshead guide, an oil-tight joint between said crosshead guide and said partition forming therebetween an oil receiving space for collecting said oil dripping from said cylinder, and drain means for removing from said oil receiving space oil drippings collected therein.

4. In an engine frame construction for an internal combustion engine having a crankcase, a piston, and a crosshead connected to said piston, the combination which comprises an engine bed, means for mounting said bed on said crankcase, a cylinder for said piston, a cylindrical crosshead guide for said crosshead, a plurality of transverse partitions across said engine bed, said partitions having coaxial apertures therein for receiving and coaxially aligning said cylinder and said crosshead guide, the inside diameter of said cylinder being at least as great as the outside diameter of said crosshead guide for preventing oil dripping from said cylinder from entering said crosshead guide, and means forming an oil-tight joint between said crosshead guide and one of said transverse partitions above said crankcase preventing oil dripping from said cylinder from entering said crankcase, said partition including said oil tight joint being inclined for collecting oil dripping thereon at the low point thereof.

5. In an engine frame construction for an internal combustion engine having a crankcase, a piston, and a crosshead connected to said piston, the combination which comprises an engine bed, means for mounting said bed on said crankcase, a cylinder for said piston, a cylindrical crosshead guide for said crosshead, a plurality of transverse partitions across said engine bed, said partitions having coaxial apertures therein for receiving and coaxially aligning said cylinder and said crosshead guide, the inside diameter of said cylinder being at least as great as the outside diameter of said crosshead guide for preventing oil dripping from said cylinder from entering said crosshead guide, means forming an oil-tight joint between said crosshead guide and one of said transverse partitions above said crankcase preventing oil dripping from said cylinder from entering said crankcase, and drain means for removing oil collected at said oil-tight joint.

6. In an engine frame construction for an internal combustion engine having a cylinder and a crosshead, the combination which comprises an engine bed, a plurality of transverse partitions across said engine bed, one of said partitions defining with said bed a crankcase space, a cylindrical crosshead guide for said crosshead, said transverse partitions having coaxial apertures therein for receiving and coaxially aligning said cylinder and said crosshead guide, an oil tight joint between said crosshead guide and said crankcase-defining partition preventing oil dripping from said cylinder from entering said crank case space, and an entrance into said engine bed providing access to said crosshead guide for the replacement thereof.

7. In an engine frame construction for an internal combustion engine having a cylinder, a crosshead and a plurality of cylinder head tie rods, the combination which comprises an engine bed, a plurality of transverse partitions across said engine bed, one of said partitions defining with said bed a crankcase space, a cylindrical crosshead guide for said crosshead, said transverse partitions having coaxial apertures therein for receiving and coaxially aligning said cylinder and said crosshead guide, an oil-tight joint between said crosshead guide and said crankcase-defining partition preventing oil dripping from said cylinder from entering said crankcase space, and a plurality of channels enclosing said tie rods and extending through said engine bed, said channels having imperforate walls within said crankcase space for confining therein oil vapors in said crankcase.

8. In a vertical diesel engine having a piston, a crosshead, a piston rod connecting said piston with said crosshead and operating free of contact with packing material, the combination which comprises a base plate, an engine bed, means for mounting said engine bed on said base plate, a cylinder block, a cylinder liner within said block, a replaceable cylindrical guide for said crosshead, a substantially horizontal transverse partition across said engine bed, an inclined transverse partition across said engine bed above said horizontal partition, a cylinder receiving flange at the top of said engine bed, coaxial circular apertures in said flange and both said partitions for receiving and coaxially aligning said cylinder and said crosshead guide, a collar on said cylinder block for mounting and aligning said block in said aperture in said flange, the internal diameter of said cylinder liner being at least as great as the external diameter of the upper end of said crosshead guide adjacent said cylinder preventing oil dripping from said cylinder from entering said crosshead guide, an oil tight joint between said crosshead guide and said inclined partition forming an oil receiving chamber for collecting oil dripping from said cylinder, drain means at the low point of said inclined partition for removing from said chamber oil drippings collected therein, mounting means accessible from below said horizontal partition for replaceably mounting said crosshead guide in said apertures in said partitions coaxially aligned with said cylinder liner, said mounting means defining with said horizontal partition and said crosshead guide a crankcase space below said horizontal partition separated from said oil receiving chamber, and entrance means in said engine bed below said horizontal partition providing access to said crosshead guide for insertion and replacement thereof.

References Cited in the file of this patent

UNITED STATES PATENTS

| 945,233 | Hatch | Jan. 4, 1910 |
|---|---|---|
| 1,604,793 | Stratton | Oct. 26, 1926 |
| 1,611,159 | Buvinger et al. | Dec. 21, 1926 |
| 2,100,775 | Fohrer | Nov. 30, 1937 |
| 2,300,747 | Read | Nov. 3, 1942 |
| 2,514,016 | Casado | July 4, 1950 |